Figure 1:
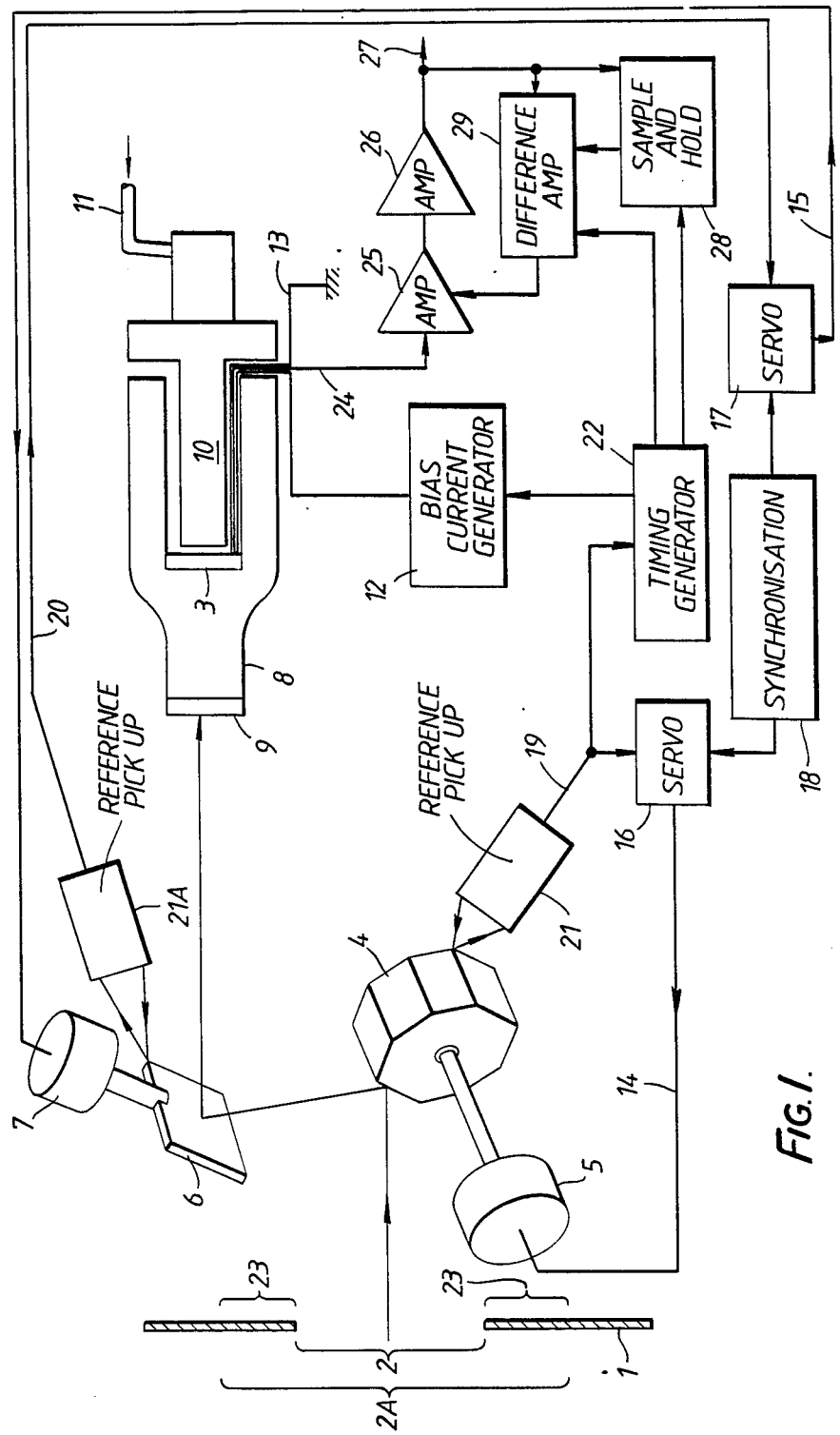

United States Patent [19]
Fremont

[11] Patent Number: 4,800,277
[45] Date of Patent: Jan. 24, 1989

[54] INFRA-RED IMAGER

[75] Inventor: Andrew de M. Fremont, Chelmsford, United Kingdom

[73] Assignee: GEC Avionics Limited, Rochester, United Kingdom

[21] Appl. No.: 84,489

[22] Filed: Aug. 12, 1987

[30] Foreign Application Priority Data

Aug. 13, 1986 [GB] United Kingdom ............... 8619719

[51] Int. Cl.$^4$ ............................................. G02B 26/10
[52] U.S. Cl. ....................................... 250/334; 250/330
[58] Field of Search ............... 250/330, 331, 332, 333, 250/334; 358/113

[56] References Cited

U.S. PATENT DOCUMENTS 3,909,521  9/1975  Hunt et al. ...................... 250/334 X Primary Examiner—Eugene R. LaRoche
Assistant Examiner—David Mis
Attorney, Agent, or Firm—Lowe, Price, LeBlanc, Becker & Shur

[57] ABSTRACT

Bias current to an array of detectors is switched off during periods when the detectors are fruitlessly receiving energy from inside the image housing to either side of an optical aperture thereof. This reduces the generation of heat in the detectors.

3 Claims, 2 Drawing Sheets

INFRA-RED IMAGER

This invention relates to an infra-red imager.

In a conventional infra-red imager an infra-red sensor receives radiation after reflection from a rotating drum having a plurality of reflective facets which cause the direction from which radiation is received by the sensor to sweep across a field of view. The infra-red detector needs to be cooled to a very low temperature of about 80° Kelvin in order to operate; and also needs to be supplied with a bias current. The bias current generates heat which must be removed by the cooling system.

The invention arose in the design of an infra-red imager employing a large number of sensors. Since each sensor made to be supplied with bias current the amount of heat to be removed is much greater than in an imager having a single sensor and it was found that the conventional cooling system was unable to retain the sensors at the required low temperature.

The inventor realised that the foregoing problem could be overcome by making use of the fact that the geometry of the rotating drum scanning mechanism means that the detector is, for some of the time during each scan, receiving stray radiation from inside the casing of the imager.

The invention provides an infra-red imager comprising an infra-red sensor of a type which consumes energy, a supply of energy for the sensor, scanning means for causing the sensor to receive radiation from a direction which scans through a range of angles and switching means for switching off the supply of energy to the sensor whilst it is receiving radiation from selected angles within the said range.

By switching off the bias current whilst the imager is receiving radiation from parts of the inside of the housing or case of the apparatus, to either side of its optical aperture, it was found that the consumption of bias current could be reduced to an extent sufficient to enable the resulting heat to be handled by the cooling system.

Figure 2:
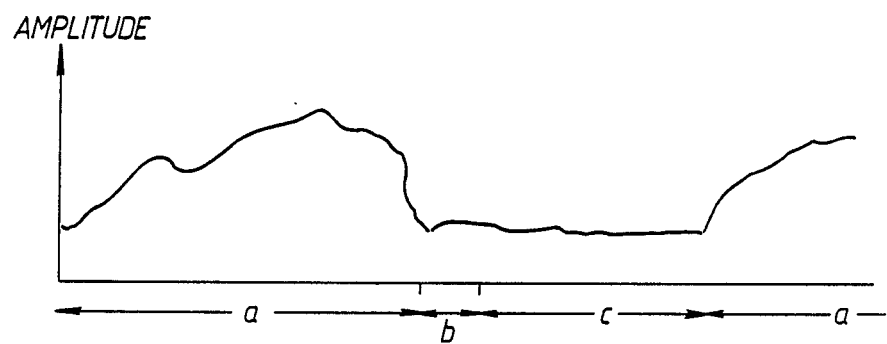

One way in which the invention may be performed will now be described by way of example with reference to the accompanying drawings in which:

FIG. 1 is a schematic diagram shown partly in perspective and partly as a block diagram of an infra-red imager constructed in accordance with the invention; and FIG. 2 is a representation of an output signal on line 27 of FIG. 1.

Referring firstly to FIG. 1, the illustrated apparatus has a casing 1 defining an optical aperture 2. An array of photo-conductive detectors 3 receives radiation from a direction which is made to scan: horizontally by a mirror-surfaced polygonal rotating drum 4 driven by a motor 5; and vertically by an oscillating mirror 6 driven by a motor 7.

The detectors of the array scan through a swathe of respective individual horizontal lines during each scanning action of the drum 4. Each such horizontal scan takes places through a range of directions subtended by the bracket indicated at 2A on FIG. 1. It is to be noted that this is larger than the aperture 2.

The detectors are enclosed within an evacuated flask 8 and the construction of this flask and of the detectors can be similar to that used in the Mullard R185 encapsulated sprite detector. The detectors inside the flask are cooled to about 80° K. by a reverse cycle Stirling cooling engine 10 driven by gas pulses supplied through a pipe 11. Such cooling engines are readily available e.g. from Philips, Lucas Aerospace, British A.C. and Hughes. Bias current for the detectors is supplied by a bias current generator 12 and an earth return lead 13 via connections which pass through a glass wall of the flask 8.

The motors 5 and 7 are controlled via lines 14 and 15 by servo drives 16 and 17 each of the latter being controlled by a common synchronisation system 18.

The servo drives 16 and 17 receive feedback signals on lines 19 and 20 from optical pick-up devices 21 and 21A which co-operate with the scanning mirrors 4 and 6.

The signal on line 19 from the optical pick-up 21 is applied to a timing generator 22, causing the latter to switch the bias current generator 12 off during most of each period when the detector is receiving unwanted radiation from the border portions 23.

Each detector has an output of which only one is shown; on line 24. The signal on this line is shown in FIG. 2. It is amplified by a variable gain amplifier 25 and a fixed gain amplifier 26 before being presented on output line 27.

In FIG. 2 the part a of the signal is derived from one scan across the aperture 2. During a short period b when the scnner has started to scan a border region 23, the timing generator 22 causes a sample and hold circuit 28 to sample the output on line 27. During the remaining part c of the period of scanning of region 23 the timing generator 22 causes a comparator 29 to reduce the gain of the amplifier 25 by an amount proportional to the difference between the signal on line 27 and the signal stored at 28.

The effect of the components 25, 28 and 29 is to remove a sharp step signal which is produced on line 24 when the bias current is switched off.

I claim:

1. An infra-red imager comprising an infra-red sensor of a type which consumes energy, a supply of energy for the sensor, scanning means for causing the sensor to receive radiation from a direction which scans through a range of angles and switching means for switching off the supply of energy to the sensor whilst it is receiving radiation from selected angles within the said range.

2. An infra-red imager according to claim 1 comprising a housing having an optical aperture and in which the scanning means causes the said direction to scan through a range of angles which embraces the said optical aperture and a region of the housing bordering the aperture, the switching means being controlled so as to switch off the supply of energy to the sensor whilst it is receiving radiation from the said region of the housing bordering the aperture.

3. An infra-red imager according to claim 2 comprising means for sampling an output of the sensor when it initially receives radiation from the said region of the housing, a comparator for comparing the sampled value with the current output of the sensor, amplifying means for amplifying the output of the sensor, and negative feedback means for controlling the gain of the amplifier according to the output of the comparator.

* * * * *